United States Patent [19]

Gössi

[11] Patent Number: 4,537,348
[45] Date of Patent: Aug. 27, 1985

[54] SYSTEM FOR EFFICIENT SERVICE WATER HEATING

[76] Inventor: Hans Gössi, Oberdorf 25, Küssnacht am Rigi, Switzerland

[21] Appl. No.: 453,931

[22] Filed: Dec. 28, 1982

[30] Foreign Application Priority Data

Jan. 8, 1982 [CH] Switzerland ............................ 106/82

[51] Int. Cl.³ .............................................. F24D 3/00
[52] U.S. Cl. ..................................... 237/8 A; 237/2 B; 236/46 F; 165/12; 126/427; 126/374; 62/238.6
[58] Field of Search ............... 126/362, 374, 378, 400, 126/435, 437, 427; 165/12, 18; 62/238.6; 219/314; 237/2 B, 8 R, 8 A, 8 B, 8 C, 8 D, 19; 236/46 F, 47

[56] References Cited

U.S. PATENT DOCUMENTS

| 3,946,802 | 3/1976 | Christenson | 126/362 X |
| 4,034,912 | 7/1977 | Hayes | 126/422 X |
| 4,044,949 | 8/1977 | Morawetz et al. | 126/437 X |
| 4,143,814 | 3/1979 | Hill | 237/8 R X |
| 4,165,732 | 8/1979 | Morin | 126/437 X |
| 4,189,096 | 2/1980 | Girard | 237/2 B |
| 4,213,563 | 7/1980 | van Kuijk | 237/2 B |
| 4,323,192 | 4/1982 | Jackson | 237/8 R X |
| 4,345,583 | 8/1982 | Morin | 126/427 |
| 4,350,144 | 9/1982 | Beckwith | 126/427 |
| 4,406,136 | 9/1983 | Picchiottino | 126/435 X |

OTHER PUBLICATIONS

European Search Report, EP 82 11 1509.

Primary Examiner—Margaret A. Focarino
Attorney, Agent, or Firm—Roylance, Abrams, Berdo & Goodman

[57] ABSTRACT

A water heating system comprises a low temperature stage with a stratified tank, connected by a line system to a high temperature stage and a distribution stage. Between the high temperature stage and the distribution stage there can be an oppositely flowing line system. Lines carry circulating or mixed water from the distribution stage to a consumption stage. A programmable switching unit is provided for monitoring and controlling the hydraulic network.

22 Claims, 10 Drawing Figures

SYSTEM FOR EFFICIENT SERVICE WATER HEATING

This invention relates to an energy-saving system for heating service water, particularly for hot water use in large and medium-sized residential units.

BACKGROUND OF THE INVENTION

When energy costs were low, hot water heating in residential units was considered to be of minor importance because adequate quantities of inexpensive energy were available to heat service water in a random manner to hot water temperature. In many cases, the water was heated to unnecessarily high scalding water temperatures which had to be lowered with large amounts of cold water to usable temperatures. For smaller dwelling units, e.g., single-family houses, less importance was attached to the economic aspects of heating water.

In large residential units, such as large hotels and the like, even with relatively favourable basic energy costs, the costs of heating water became a significant expense so that measures to economize were taken at an early stage. However, these measures were mainly limited to reducing line loses by adequate insulation. Measures involving the dynamics of hot water consumption were rarely used.

In 1973, DOS No. 2,231,231 disclosed an automatic mixing water installation for minimizing the temperature differences of the mixed water used which indirectly led to considerable energy savings. Considerable interest can be attached to the described measures, e.g., in community or municipal showers, to ensure that the user received the water at physiologically usable temperatures.

The described arrangement keeps the temperature differences in the mixed water drawn-off very low by an automatic mixing water installation with lines for supplying hot and cold water and with means for regulating the mixing of the cold and hot water. The temperature is maintained whether large or small mixed water quantities are removed as compared with the maximum possible water delivery. This function can be achieved by a closed mixed water circuit, possibly with feeding in mixed water and draw-off points, which circuit is also connected to the secondary side of a heat exchanger. The mixed water quantities circulating in this circuit having the desired discharge temperature cause a temperature compensation to take place so that thermal losses are compensated by the heat exchangers. An important advantage is that the installation is independent of a boiler or hot water tank. Thus, it requires no connecting lines between the mixed water and a boiler because the mixed water circulation forms its own operationally reliable, closed circuit.

Since 1973, the raw energy prices have increased considerably, making the earlier, simple solutions unacceptable. subtle and better thought-out solutions have been proposed and are now used. Ever-increasing importance is attached to different energy sources for the purpose of heating water, and in particular, energy from low temperature-generating units is being coupled into the known high temperature-generating systems.

Apart from solar cells, the heat pump is the most widely used means. However, the difficulties encountered in inexpensively heating water by means of a heat pump are described, e.g., in the article entitled "Warmepumpe, Argumente fur Beratung und Verkauf in Einfamilienhausern", Haustechnik, Vol. 12, 1981, No. 10, p.36ff. The decisive problem in using heat pumps is that without hot water accumulation or storage, heat pumps are unable to provide easily the required hot water with the presently conventional calorific power levels of 3 to 10 kW. With an adequate storage volume, equipment with a low calorific power can cover a high daily demand if sufficiently long intervals are permitted between the draw-off periods. Additional heating only improves the hot water capacity if there is sufficient heating time between two large water removal periods. Even with acceptable efficiency figures, the storage problem continues to exist because sufficiently large water tanks are relatively expensive and the amortization period is too long. Therefore, heat pumps cannot be used in large residential units, e.g., apartment houses or hotels, due to the storage problem, i.e., the cost/use ratio is disadvantageous.

The possibilities of using solar cells for heating water is described, inter alia, in chapter 17, "Solar Energy—Water Heating, Possibilities of Use", p.456ff. This discusses the additional problem of limitation to small residential units at peak loads.

BRIEF DESCRIPTION OF THE INVENTION

An object of the present invention is to provide a system for the energy-saving, inexpensive heating of water which can be used in large residential units.

Other objects, advantages and salient features of the present invention will become apparent from the following detailed description of preferred embodiments of the invention.

Briefly described, the invention includes a method for heating service water. The method comprises heating quantities of service water to a lower temperature range and a higher temperature range, and then supplying the service water heated to one of the temperature ranges for a shorter time period to a draw-off point, then service water heated to the other temperature range.

The invention also includes an apparatus for providing heated service water comprising lower and higher temperature stages, a distribution stage, lines coupling the stages and valves in the lines operated by a programmable control to regulate flow through the lines. The higher and lower temperature stages have means from heating service water to the appropriate temperatures. The distribution stage mixes and circulates the service water subsequently conveyed to a consumption stage. The programmable control monitor regulates the operation of the remainder of the apparatus.

With the method and apparatus of the present invention, water can be inexpensively heated with a minimum of energy.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of this specification, and wherein.

DETAILED DESCRIPTION OF THE PREFERRED EMBODIMENTS

Water has a particularly high specific heat such that about 45 kJ are required to heat 1 kg of water by 10° C. A simple calculation shows that this energy would raise 1 kg by 427 m or accelerate it by 400 km/h. For heating water (and also for other heating purposes), energy quantities are required which are significantly greater than other daily energy requirements. Thus, energy savings are particularly possible when heating or using energy-containing hot water. In the same way, since it is advantageously possible to utilize the capacity of water for transferring thermal energy to its destination, water also very disadvantageously transfers energy away from a system.

Figure 1:
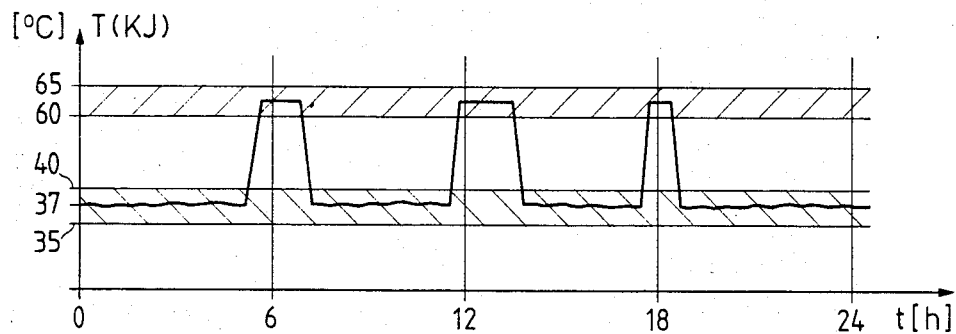
FIG. 1 is a partial, graphic representation of a method according to the present invention.

FIG. 1 diagrammatically illustrates the method of the invention. The given water temperature supply is a function of time and in the present case also a function of a 24 hour cycle. The internal energy of the water available at the destination, i.e., the draw-off points, is shown on the ordinate, preferably in two practicable temperature ranges. The lower temperature range is approximately the physiological temperature of 37° C., in a range of about 38° C. to about 44° C., and is for body hygiene. The higher temperature range is about 60° C. to about 65° C., i.e., well above the physiological or body hygiene temperature, and is for hygienic purposes on non-biological objects. One water temperature range is obtained from the water of a l.t. store and the other is from a h.t. store. Intermediate temperatures can be obtained by mixing water from the two temperature ranges.

For example, at 6 a.m., noon, and 6 p.m., there are peaks in the water temperature supply. For a limited period at these times, e.g., at mealtimes, water at a higher temperature is required. Individual "programs" for hotels, clinics, apartment blocks, single-family dwellings and baths can be generated. The present example relates to an apartment block which requires additional hot water at mealtimes. This requirement is diagrammatically shown as a peak thermal energy demand at three times, but not a peak demand for water volume.

The peak water volume demand can diverge from the diagram of FIG. 1, e.g., by showers and baths, between the high temperature demand peaks at which smaller water volume demands are made for dishwashing and cooking purposes. The energy profile is better adapted to demand splitting between the l.t. and h.t. supply. In addition, such split serves to use cheap energy, which is generally l.t. energy, in an optimum manner into the energy profile to obtain an optimum energy supply.

Figure 2:
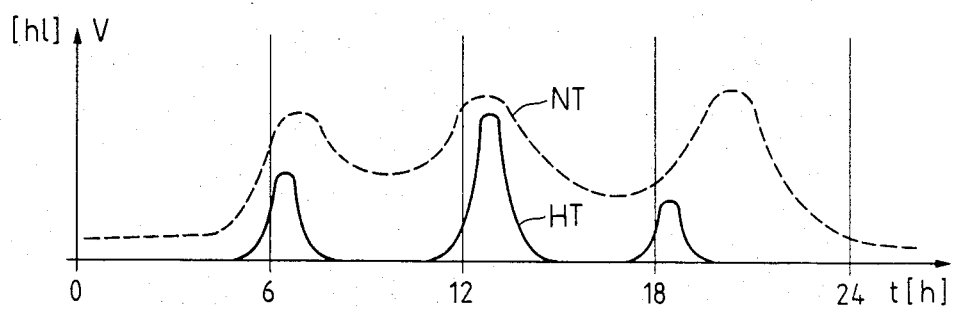
FIG. 2 is a graph illustrating the consumption of low temperature (l.t.) and high temperature (h.t.) water in a 24 hour period.

The consumption of l.t. and h.t. water in a 24 hour cycle is shown in FIG. 2. Between 11 p.m. and 5 a.m., the l.t. water consumption in apartment blocks and hotels drops to a minimum. By limiting supply, h.t. water consumption is zero. The heat energy which can be removed from the system has upper limits in terms of maximum temperature and storage capacity. Both limits are fixed by the dwelling unit and by habits.

In this example, the h.t. water program is fixed at three peaks, whereas the l.t. water program is flexible. As a further development, a fixed energy program over a 24 hour cycle could be used such that there is adequate flexibility in an internal dynamics of the system, while limiting the energy consumption within fixed boundary conditions. Thus, the energy cost, e.g., of an apartment block, can be fixed with the internal displacement of the thermal energy in the system ensuring that the energy is always available where it is consumed. The minimum quantity of internal heat is removed from the overall system as waste heat. This is brought about, e.g., by the coupling of two or more basic units according to the invention. Coupling takes place by means of the control or computer units with hierarchically graded circuits.

In the example of FIG. 2, the l.t. water consumption peak coincides with the main h.t. water consumption due to assumed habits.

Providing substantially random hot water quantites at the draw-off points requires accumulation or storage volumes of such magnitude that the volumes can handle large variations between draw-off times and draw-off intervals. In an apartment block equipped with such system, it is possible to provide up to 80% of the hot water requirement from the l.t. boiler or tank, with only 20% of the requirement supplied by the more expensively operating h.t. boiler or tank. This hot water supply satisfies modern hygiene requirements which is remarkable in view of how inexpensively the low temperature water can be produced.

Figure 3:
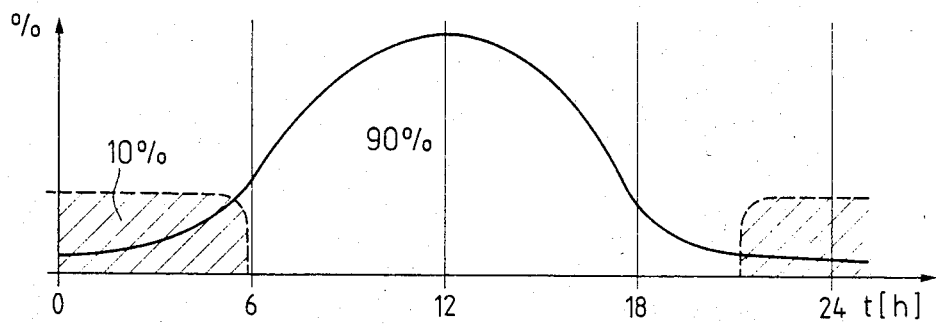
FIG. 3 is a graph illustrating storage of solar heat for l.t. water and night current heat for h.t. water.

FIG. 3 shows an example of the storage of l.t. and h.t. energy as internal energy in the water. In a 24 hour cycle, an energy supply for the l.t. tank from solar energy is shown for the 12 hours between 6 a.m. and 6 p.m., as well as an energy supply for the h.t. tank, e.g., using night rate power, in this case, between 8 p.m. and 5 a.m. For storage, 90% of the total energy demand is for l.t. heat and 10% is for h.t. heat. This naturally assumes adequate insulation to minimize compensation for storage and line loses by expensive energy sources, such as oil or electricity.

Figure 4:
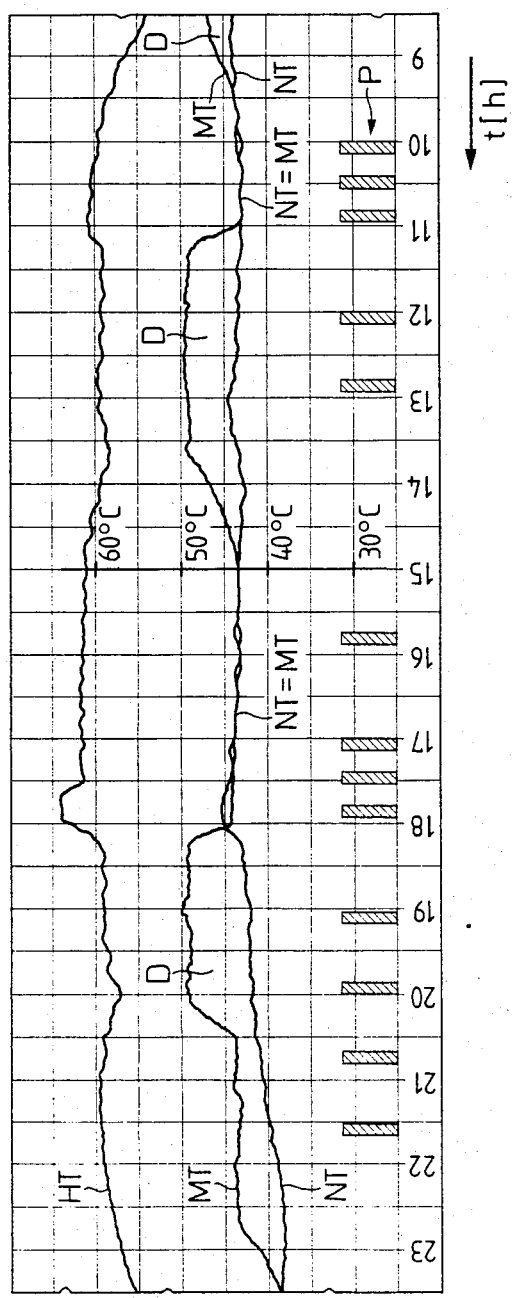
FIG. 4 is a graph illustrating operation of a water heating system.

FIG. 4 shows a portion of a measuring diagram obtained by performing measurements in the aforementioned apartment block. The temperature is given in °C. on the ordinate, while the time in hours of the 24 hour cycle is given on the abscissa. The period 9 a.m. to 11 p.m. is presented with time running from right to left.

Three temperature curves show the temperature for l.t. water (curve NT), h.t. water (curve HT), and mixed water (curve MT). The pulse groups P on the abscissa represent in graphic form the energy pulses which are introduced into the system in the h.t. stage by switching on or off an oil firing system or electric current. The pulse width essentially corresponds to the representation on the time axis for 10 to 20 minutes. The distance between two energy pulses is a function of demand resulting from use or unavoidable thermal losses.

Starting at the right hand side of FIG. 4, the m.t. curve drops onto the l.t. curve to define the triangular area D between curves. This area D designates the energy deficiency relative to the l.t. stage. The supply of hotter water in the early morning, e.g., at 6 a.m., is provided by the h.t. stage because the l.t. stage cannot then provide it. From 9:30 a.m., l.t. equals m.t., i.e., the hot water demand is completely provided by the l.t. stage. Between 10 a.m. and 11 a.m., the oil burner is switched on at time intervals, e.g., three times, to raise the temperature in the h.t. stage as indicated by the h.t. curve, e.g., somewhat over 60° C. In accordance with the program, the mixed water temperature m.t. is raised to, e.g., 50° C. at 11 a.m., i.e., h.t. water is admixed with the l.t. water. According to the invention, cold water is not mixed with hot water, but preheated water is admixed with the hot water in the mixing stage, the preheated water being produced by alternative energy at lower cost.

The switching of the corresponding controls and the activation of the particular circulating pumps, e.g., after night switch-off in the morning, allows the temperature to rise rapidly to the desired level in the mixed water circuit. A slight fall in the h.t. curve shows the energy removal in the h.t. stage and the energy pulses on the abscissa indicate the replacement of the removed energy. At 1:30 p.m., the controls are switched in accordance with the program and the temperature in the m.t. circuit slowly drops, as a function of the m.t. water removal and the energy loss in the m.t. stage. The apartment block is supplied with hot water by the l.t. stage up to 6 p.m. The control system associated with the apparatus ensures the activation of the necessary energy pulses for maintaining the programmed temperatures. Note should be taken of the marked correlation of the three curves on switching at 6 p.m.

This is followed by the normal night drop since no h.t. water is removed at night. All the hot water is supplied either by the mixed water circuit or by the low temperature tank.

Figure 5:
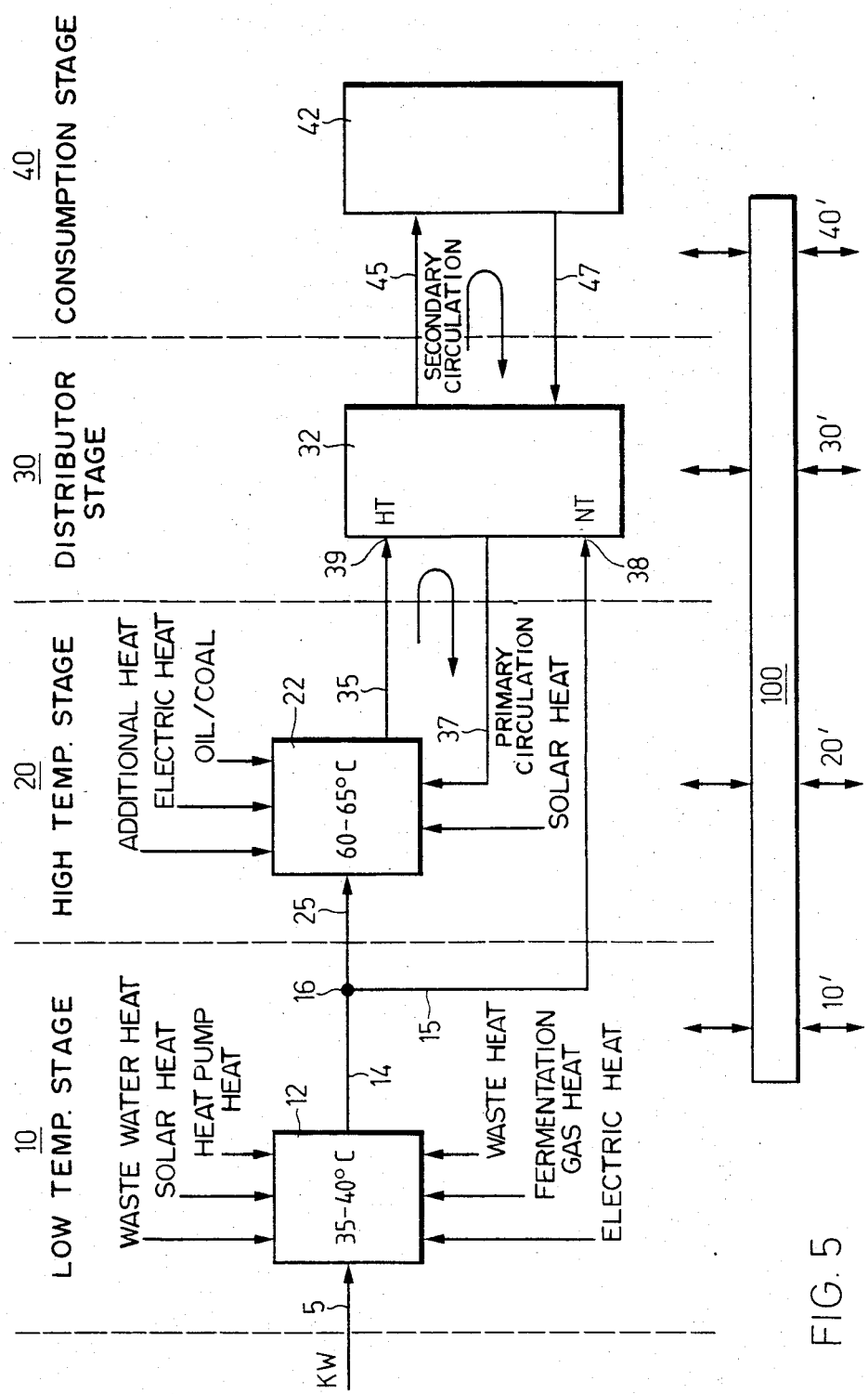
FIG. 5 is a schematic diagram of a water heating system according to the present invention.

FIG. 5 surveys one apparatus for performing the method according to the invention. The unheated water kW passes through a supply line 5 into a l.t. stage 10, where it is preheated by heat from l.t. heat sources, e.g., heat recovered from waste water, waste heat or remote heat, solar heat, heat pump heat, etc. It is also possible to use higher-grade, but inexpensive energy, such as, e.g., fermentation gas heat or low rate electric heat. The untreated water kW is heated from between 10° and 20° C. to approximately 40° C., in a low temperature heat tank or boiler 12. The highertemperature water is passed via a line 14, e.g., to a branch 16, from where it is either supplied by line 25 to the h.t. stage 20 or by line 15 to the mixing/distributor stage 30. The preheated water can also simultaneously flow to both stages.

In the h.t. stage 20, the preheated water flowing from the l.t. stage 10 via line 25 passes into the h.t. heat tank or boiler, where it is further heated. The requisite h.t. heat sources can be oil, electricity and coal, and inexpensive additional energy sources such as remote heat, fermentation gas, solar heat, etc., enabling such additional sources to be used as h.t. energy sources. In the h.t. stage, the water is heated further to a temperature of, e.g., between 60° and 65° C. The water heated in the h.t. boiler passes via line 35 into mixer/distributor 32 of the mixing/distributor stage 30, which has a further l.t. water connection 38, apart from the h.t. water connection 39. Thus, by mixing water in mixer/distributor 32, any water temperature between 40° and 65° can be produced, i.e., according to FIG. 1, any temperature within the temperature program. The operation of the mixer/distributor 32 is described in detail in DOS No. 2,231,231, which in incorporated herein by reference.

High temperature water is returned from the mixer/distributor stage 30 to the h.t. stage 20 via line 37. According to the present invention, water can continue to flow via line 15 during deactivation of the h.t. stage, e.g., for showers or baths, for which h.t. water is not used. The use of h.t. water is controlled by the temperature program to a major extent and to a minor extent by the mixing of the h.t. water and l.t. water supply.

From distributor 32, the hot water flows via line 45 into the consumption stage 40 to consumption point 42 with the corresponding draw-off points, and from there by means of circulation line 47 back to the mixer/distributor 32. The water circulating in the two lines 45, 47 between the mixer/distributor stage 30 and the consumption stage 40 is either only h.t. water, or l.t. water, or mixed water.

A circuit-controlled or program-controlled unit 100 receives from each stage, control, temperature and other state data and transfers corresponding program-based control and/or regulating data to the individual stages. Such a control unit 100 can also supply other means 10', 20', 30', 40' in accordance with the program. This is indicated by the downwardly extending double arrows to the stages 10', 20', 30', 40' belonging to another unit.

There is no water circulation in the l.t. boiler, as opposed to the h.t. boiler. The l.t. boiler is a thermally stratified boiler with a temperature gradient, but with no water return. The stratification corresponds to the density of the water in the gravitational field. The supply and removal of cold or hot water are accomplished such that there is no serious disturbance to the temperature gradient parallel to the gravitation. The convection flow-producing heat exchangers are similarly arranged for this purpose. The heat exchange capacity is substantially at a maximum level by this arrangement.

Figure 6:
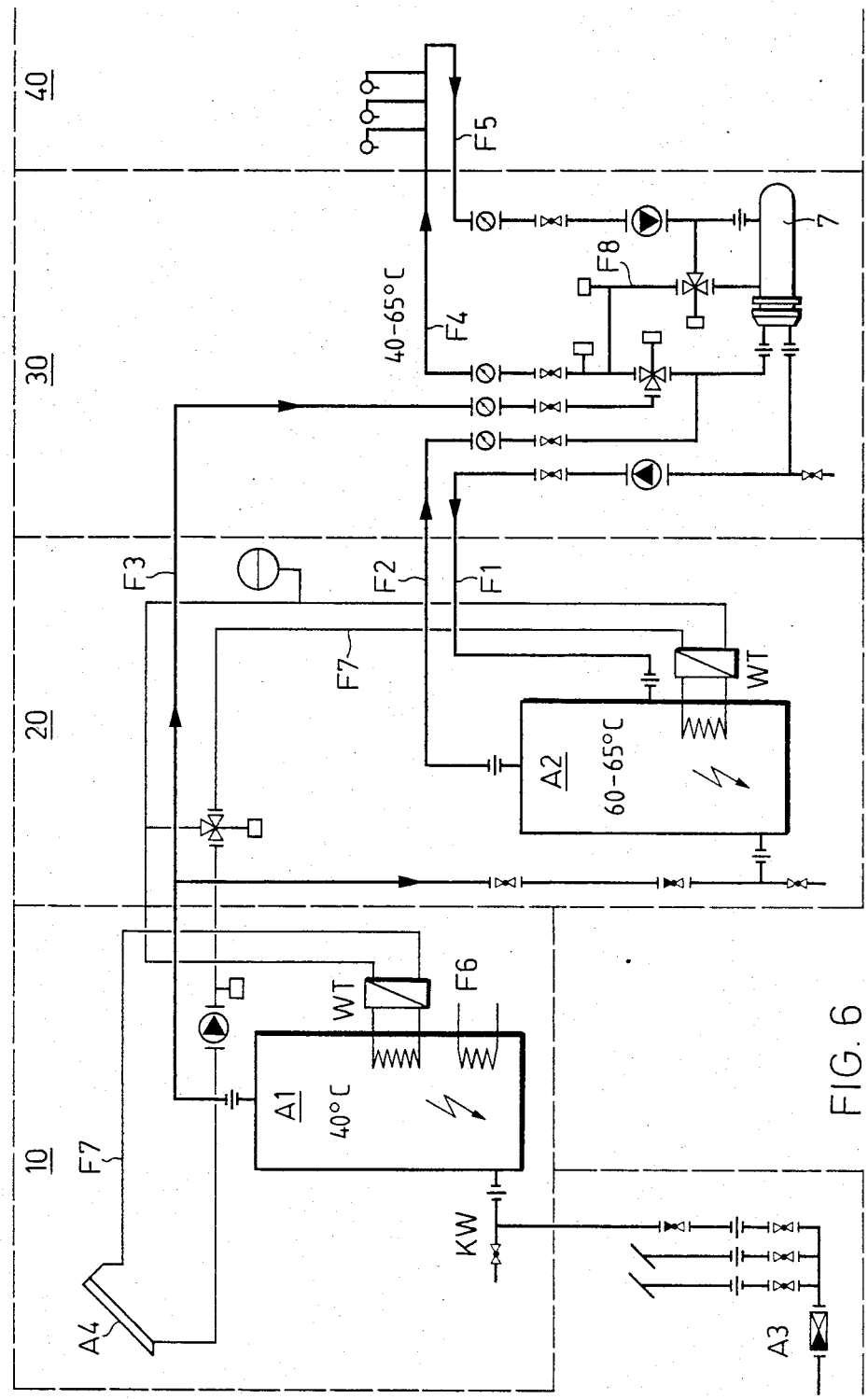
FIG. 6 is a schematic diagram of a system in which solar heat is used for the low temperature stage.

FIG. 6 shows an hydraulic diagram of an apparatus for performing the method according to the invention. As it is a simplified representation, the conventional details have been omitted. This embodiment involves a solar additional energy supply, although the solar cells can be replaced with a low temperature-producing heat pump. Thus, the illustrated l.t. tank could be replaced by a heat pump tank. In FIG. 6, individual functional stages are shown, which correspond to the corresponding stages of FIG. 5 and are also given the same reference numerals. The l.t. stage 10 comprises a solar cell A4 with the associated lines F7, a cold water pretank A1 corresponding to the l.t. tank 12, a heat exchanger WT for transferring l.t. heat from the solar cell to an, in this case, unused, but still provided, heat recovery means F6, a connection KW for the cold water from a cold water distribution battery or source A3, as well as the possibility of an additional electrical heating system. The corresponding low temperature line system is designated F3.

The h.t. stage 20 comprises a hot water boiler A2 with a l.t. water supply from the line system F3, a heat exchanger WT for transferring low temperature heat from the solar cell system A4 via line system F7, as well as connections for lines F1 and F2, through which a h.t. water circulates in the direction of the arrows. The high temperature tank A2 can also be heated with additional energy, e.g., electrical power or from an oil firing system.

Two lines, namely, l.t. water line F3 and h.t. water line F2, lead into distributor stage 30 where the mixed water is produced. A heat exchanger 7 is maintained at the operating temperature by the h.t. water circuit in lines F1 and F2 via h.t. tank A2. A further circuit leading to this heat exchanger is represented by line system F4, F5, F8. The final line system leads to the mixed water circuit maintained at the intended mixed water temperature in heat exchanger 7. This mixed water circuit leads via lines F4 and F5 to the consumption stage 40 with the corresponding draw-off points and is operated by a pump associated with the circuit. Various thermal sensors located in this distribution system control the corresponding motor-operated valves for the adequate mixing of the service water supplied or for switching from h.t. water or l.t. water at the draw-off points.

This hydraulic diagram directly shows the interaction of the two h.t. and l.t. tanks. A significant drop in the energy content in the l.t. tank can be temporarily compensated for by the energy content of the h.t. tank by admixing. In the draw-off pauses and during the draw-off times, the temperature is raised again by heat pumps or solar energy in the l.t. tank. In the h.t. tank, the temperature is raised by electric power or oil firing during the activation times corresponding to energy pulses P in FIG. 4. Additional programming in the electric circuit for the valve control regulates the switching on and off during the consumption peaks. Since inexpensive lower temperature water cannot satisfy the peak demands, including that of higher temperature water, oil or electric power is used to a limited extent and in an economical manner. As stated hereinbefore, it is possible to cover 80% of the hot water consumption by lower temperature energy, the remaining 20% being provided by oil firing or electric heating. Thus, there is no need for the large tanks required in conventional systems for large dwelling units. As will be shown by the following calculations, the additional expenditure can be amortized within 3 to 5 years.

Figure 7:
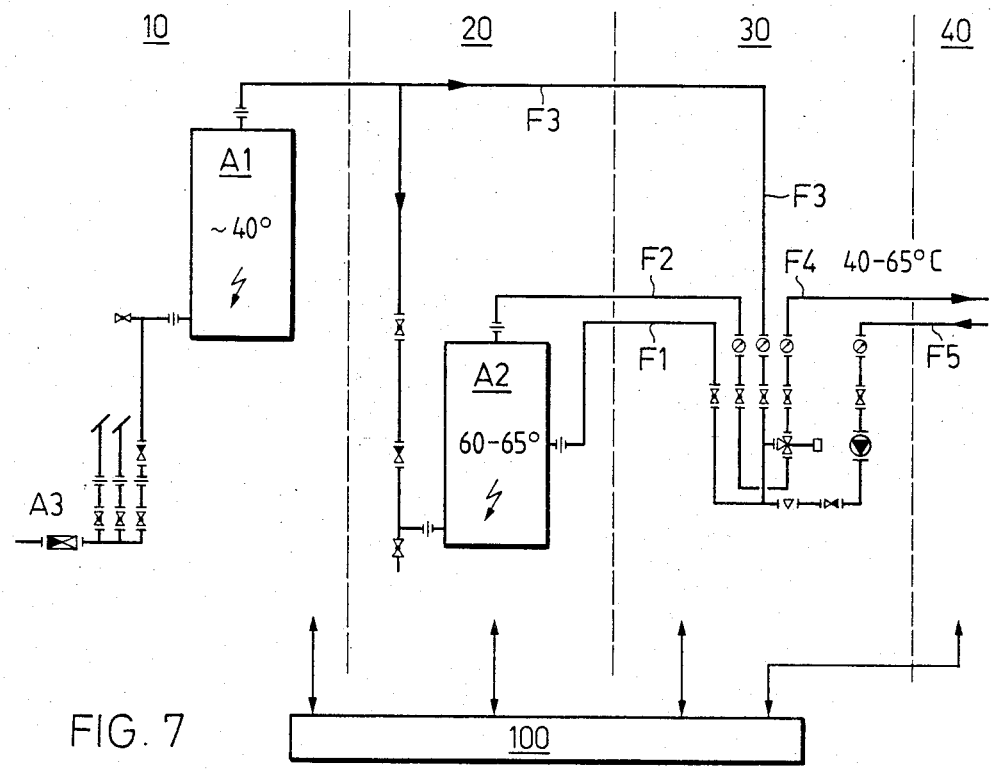
FIG. 7 is a schematic diagram of a system similar to that of FIG. 6 in a simpler form and with a low temperature boiler operated by heat pump energy.
Figure 8:
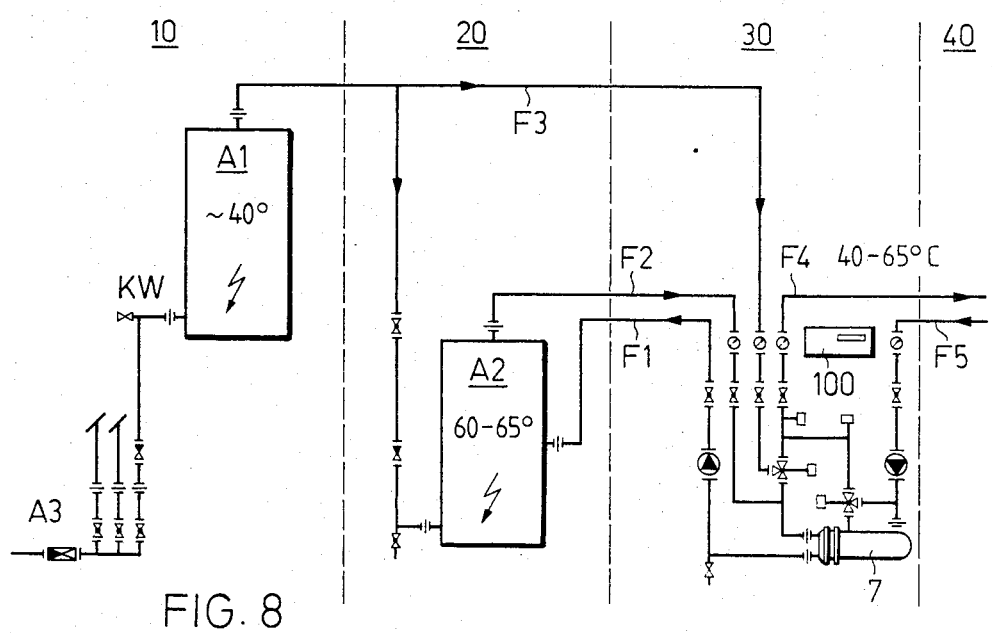
FIG. 8 is a schematic diagram of a system similar to that of FIG. 7 with a secondary circuit for the mixed water.

FIGS. 7 and 8 show the hydraulic diagrams of two embodiments for apparatus according to the present invention. The l.t. stage 10 for preheating the service water employs alternative energy in the form of heat pump thermal energy. The h.t. stage 20 for heating the service water compensates for deficienceies. Distributor/mixer stage 30 mixes h.t. water with l.t. water at a service water temperature. Distributor stage 30 can comprise a single distribution battery as illustrated in FIG. 7 or a distribution battery with recirculation and heat exchanger 7 as illustrated in FIG. 8. The efficiency is further increased or the hot water heating costs further reduced by the recirculation via the heat exchanger of FIG. 8 as compared with the h.t. stage of FIG. 7. Consumer stage 40 in both embodiments completes the apparatus. A control unit 100 is provided for the monitoring, controlling and regulating of the apparatus.

Figure 9:
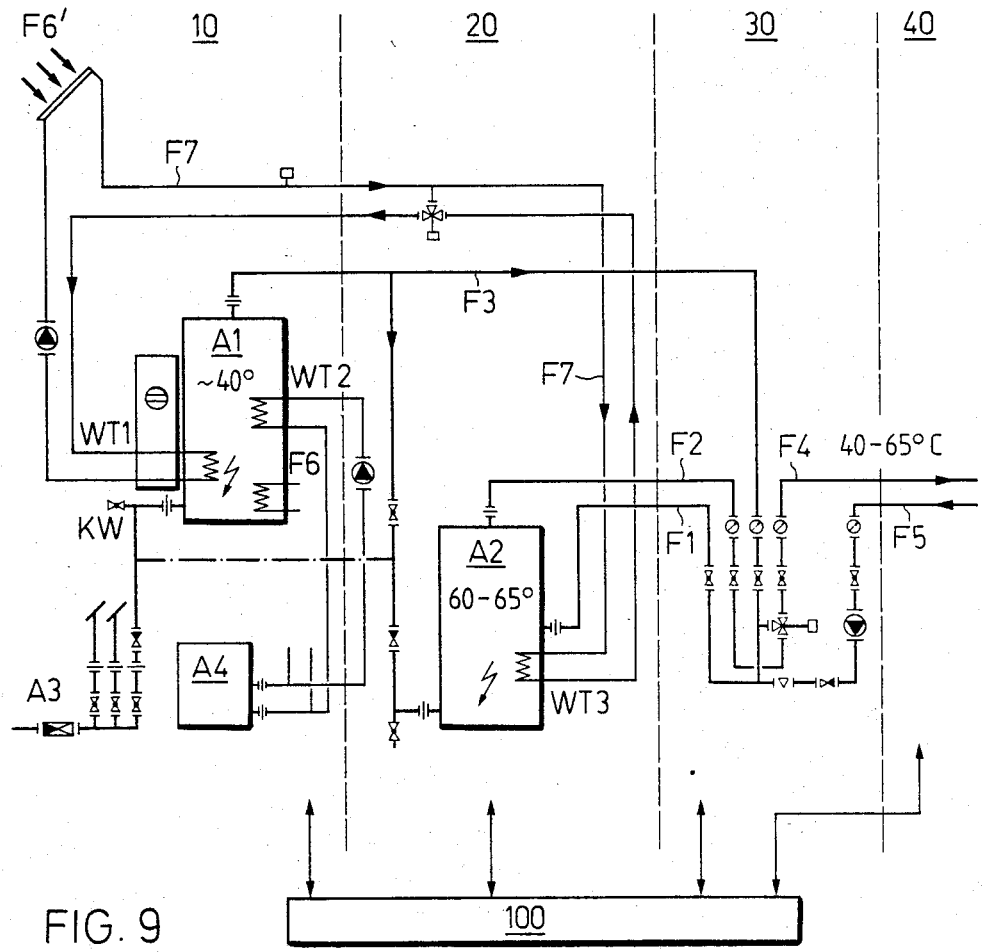
FIG. 9 is a schematic diagram of a system according to another embodiment of the present invention.
Figure 10:
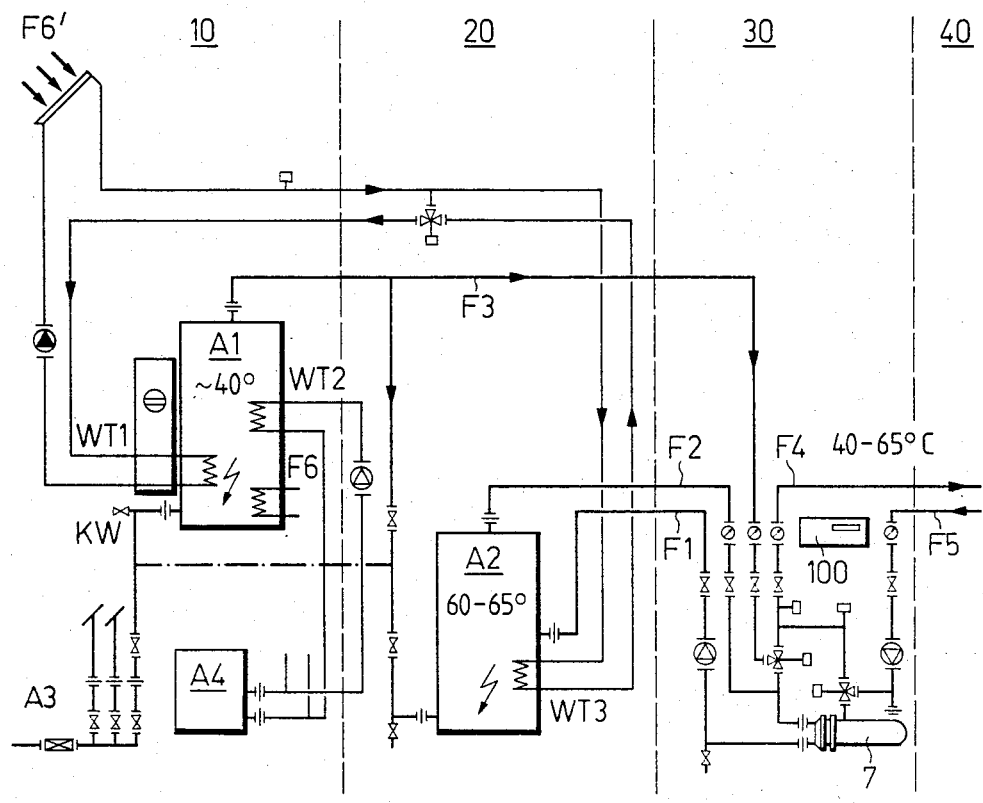
FIG. 10 is a schematic diagram of a system according to a further embodiment of the present invention.

FIGS. 9 and 10 illustrate other embodiments in which l.t. stages 10 are operated by solar heat and by a further alternative heat source A4 supplied, e.g., by fermentation heat, remote heat, etc., providing higher temperature energy. Various heat exchangers WT are arranged along the temperature gradient in various heat zones or layers, as a function of the temperature of the heat supplied.

The dense cold water is introduced at inlet KW into tank A1 at its bottom. A heat exchanger is located above inlet KW for supplying at F6, e.g., low temperature waste heat or return heat to be exchanged with maximum efficiency in the coldest layer of the tank. Further upwards, i.e., in the already preheated layer and consequently with a somewhat reduced efficiency, solar heat is supplied via its heat exchanger WT1. Still higher a heat exchanger WT2 with the highest energy concentration is located.

The efficiency of heat transfer of the last two heat exchangers would be higher from the temperature standpoint in the lower layers. However, utilizing the maximum efficiency of individual heat exchangers would prevent utilization of the heat sources with a low energy content. The natural convection of the medium caused by density differences would be too great to enable the introduction into the same tank of heat from different sources and at different temperatures. Overall, this arrangement increases the efficiency of the tank since the individual heat exchangers are being used in an optimum manner with respect to the overall efficiency of the system.

With an adequate amount of sunshine and high efficiency of solar cells F6, water is temporarily heated up to 90° C. and is introduced directly into the h.t. stage 20 (as shown in FIG. 6) to exchange its energy in boiler A2. Thus, there is no need for additional energy, as represented by heating pulses P in FIG. 4, for long periods of the day to further economize, e.g., on expensive heating oil energy. The mixing/distributing stage 30 is shown in FIG. 9 as a single distributing battery with recirculation via lines F1, F2 in boiler A2, and in FIG. 10 as being separated hydraulically from boiler A2 by means of a heat exchanger 7.

The waste heat, for transfer to the l.t. tank, can be provided by the thermal energy from ironing machines, tumble dryers, cooling systems, kitchen heating systems, etc. This more particularly applies in large units such as hospitals, hotels, barracks, etc. Return heat is mostly obtained from hot waste water. As a result of the thermal stratification, it is possible in very large l.t. tanks to adequately reuse any thermal energy from different sources.

The following cost survey shows the effectiveness of the system of the present invention for an apartment and business building with eight units. Hot water costs are reduced almost 78% over a 12 month period. This means that expenditure for hot water, as a result of the reorganization according to the invention, now only amounts to one-sixth of the previous expenditure. As this building is heated with oil, the percentage saving for oil is naturally lower, because account must be taken of the overall heating. However, about a third can be saved on the total heating oil costs for hot water and heating.

| Hot water costs of the described embodiment (and according to measurement strip of FIG. 4) | |
|---|---|
| Hot water costs before reorganization | SF 5,237 |
| Hot water costs after reorganization | |
| Heat pump from 10 to 42° C. SF 928 | |
| Night current from 42 to 57° C. SF 172 | SF 1,174 |
| Savings per year | SF 4,063 |
| calculated for oil with night current at present correspondingly cheaper rate | 77.6% |
| Heating oil consumption before reorganization for water heating | 6,983 kg |

| | |
|---|---|
| Heating oil consumption after reorganization for water heating | 230 kg |
| Heating oil savings after reorganization | 6,753 kg |
| = | 96.7% |

While certain advantageous embodiments have been chosen to illustrate the invention, it will be understood by those skilled in the art that various changes and modifications can be made therein without departing from the scope of the invention as defined in the appended claims.

What is claimed is:

1. A method for providing heated service water, comprising the steps of:
   heating a quantity of service water to a lower temperature range in a lower temperature stage;
   heating a quantity of service water to a higher temperature range in a higher temperature stage;
   conveying service water between the lower and higher temperature stages through a first line means;
   conveying service water directly and separately from each of the higher and lower temperature stages to a distribution stage through second line means;
   mixing and circulating service water in the distribution stage;
   conveying service water, from the distribution stage to a consumption stage draw-off point through a third line means, of one of the temperature ranges for a shorter time period than of the other temperature range, and conveying lower temperature stage service water directly to the distribution stage and then to the consumption stage without being mixed with service water of the higher temperature stage;
   controlling flow of service water through the line means by valve means; and
   monitoring operation of the method and regulating operation of the valve means with programmable control means.

2. A method according to claim 1 wherein service water of the higher temperature range is supplied in predetermined time periods, and service water of the lower temperature range is supplied in intermediate time periods to the draw-off point.

3. A method according to claim 2 wherein the service water of the higher temperature range is supplied by service water of the lower temperature range heated by additional heating.

4. A method according to claim 3 wherein the service water of the higher temperature range is produced by mixing water at a temperature above the mixing temperature with water preheated to the same or a lower temperature than the mixing temperature.

5. A method according to claim 4 wherein the service water of the lower temperature range is heated by low temperature thermal energy from at least one of solar cells and heat pumps, and the service water of the higher temperature range is produced by admixing water heated by at least one of electric and oil firing energy.

6. A method according to claim 3 wherein the service water of the lower temperature range is heated by waste heat, and the service water of the higher temperature range is produced by admixing water heated by at least one of solar energy, coal energy, fermentation gas energy, electric energy and oil energy.

7. A method according to claim 4 wherein the service water of the lower temperature range is heated by supplying energy at different temperature stages and is introduced into a hot water tank to form a temperature gradient.

8. A method according to claim 7 wherein service water of the lower temperature is not recirculated with other tanks.

9. An apparatus for providing heated service water, comprising:
   a lower temperature stage having means for heating service water to a lower temperature range;
   a higher temperature stage having means for heating service water to a higher temperature range;
   first line means for coupling said lower temperature stage and said higher temperature stage in fluid communication;
   a distribution stage having means for mixing and circulating service water;
   second line means for coupling said higher temperature stage to said distribution stage in fluid communication;
   third line means for conveying service water from said distribution stage to a consumption stage;
   fourth line means for directly coupling said lower temperature stage to said distribution stage in fluid communication;
   valve means for controlling the flow of service water through said line means; and
   programmable control means for monitoring operation of the apparatus and regulating operation of said valve means such that service water of one of the temperature ranges is conveyed to said consumption stage for a shorter time period than service water of the other temperature range, and such that lower temperature stage water is conveyed directly to said distribution stage and then said consumption stage without being mixed with service water of said higher temperature stage.

10. An apparatus according to claim 9 wherein said lower temperature stage, higher temperature stage, said distribution stage and said consumption stage are coupled to a central programmable control means.

11. An apparatus according to claim 10 wherein a plurality of programmable switching means are interconnected with said stages for shifting thermal energy within the apparatus.

12. An apparatus according to claim 9 wherein said lower temperature stage comprises a heating tank with heat exchangers arranged at different gravitation levels.

13. An apparatus according to claim 12 wherein said lower temperature stage comprises a cold water inlet located at the lowest possible level of said heating tank.

14. An apparatus according to claim 13 wherein said lower temperature stage comprises at least two heat exchangers operated at different temperatures.

15. An apparatus according to claim 14 wherein said exchangers are operated by at least one of solar heat and heat pump heat.

16. An apparatus according to claim 14 wherein said heat exchangers are operated by at least one of waste heat and solar heat.

17. An apparatus according to claim 14 wherein said exchangers are operated by at least one of fermentation gas heat and heat pump heat.

18. An apparatus according to claim 14 wherein said heat exchangers operated by at least one of electric heat and heat pump heat.

19. An apparatus according to claim 14 wherein said heat exchangers are operated by at least one of electric heat and solar heat.

20. An apparatus according to claim 14 wherein said lower temperature stage comprises an additional heat exchanger with means for receiving waste heat from such devices as tumble dryers, ironing machines and cooling systems.

21. An apparatus according to claim 9 wherein said higher temperature stage comprises a boiler having an additional heat exchanger with means for receiving solar energy.

22. An apparatus according to claim 21 wherein said additional heat exchanger is operated in connection with a heating means employing another form of high temperature energy.

* * * * *